Aug. 25, 1953  J. T. CRANDALL  2,649,833
MANUFACTURE OF LINES FOR RACQUETS
Filed April 14, 1949
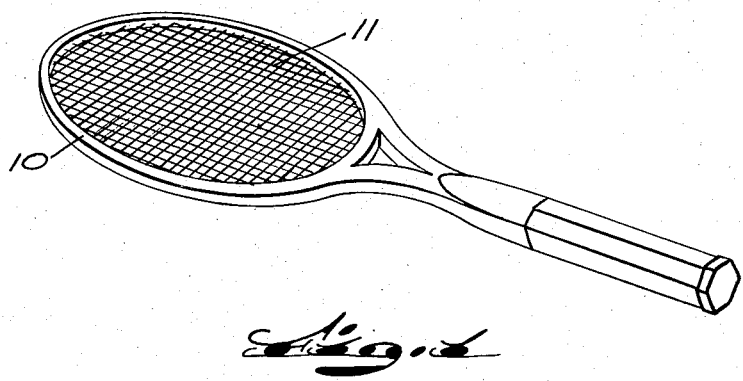
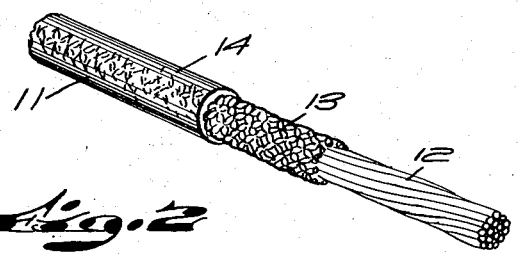
INVENTOR.
Julian C. Crandall
BY Nathaniel Frucht
Attorney Patented Aug. 25, 1953

2,649,833

UNITED STATES PATENT OFFICE 2,649,833

MANUFACTURE OF LINES FOR RACQUETS

Julian T. Crandall, Ashaway, R. I., assignor to Ashaway Line & Twine Mfg. Co., a corporation of Rhode Island Application April 14, 1949, Serial No. 87,382

8 Claims. (Cl. 87—1)

The present invention relates to the manufacture of lines for stringing tennis, badminton and squash racquets, and has particular reference to a novel construction therefor.

The principal object of the invention is to provide an improved synthetic plastic line for stringing tennis racquets and the like.

Another object of the invention is to provide an improved line comprising a plastic filament core and an integrally joined plastic cover.

A further object of the invention is to provide a synthetic plastic line having great strength, elasticity, and resistance to fatigue and distortion.

With the above and other objects and advantageous features in view, the invention consists of a novel method and a novel article more fully disclosed in the detailed description following, in conjunction with the accompanying drawings, and more specifically defined in the claims appended thereto.

In the drawings,

Fig. 1 is a perspective view of a tennis racquet strung with the improved line; and Fig. 2 is an enlarged portion of the line, parts being broken away to show the elements thereof.

It has been found desirable to provide an improved line for stringing racquets, which has great strength, is very resilient, has great resistance to tension strains and to flexing, and has a smooth, water and oil proof outer surface. To this end, I have devised a composite construction which utilizes a center core of twisted synthetic plastic filament, and a braided cover of synthetic plastic filament, the cover being joined to the core by a synthetic plastic solution which hardens to integrate the cover and core and to provide a smooth, hard, abrasion resisting surface finish.

I have found that the most suitable plastic for use for such lines is of the amido-polymer type, and that nylon is particularly desirable because it orients under tension when drawn down to the desired diameter and increases the strength of the line. Thus, I have found it desirable to manufacture the line under sufficient tension to provide an orientation sufficient to affect a ten percent increase in strength.

Referring to the drawings, Fig. 1 illustrates a racquet 10 which has been strung with the improved line 11. The line 11, as shown in Fig. 2, has a twisted core 12, a braided sheath or cover 13, and a hard surface layer 14 formed by the integrating plastic solution which penetrates through the cover and locks the cover and the core together. The resulting line has a twisted core, an integrated braided sheath, and a smooth outer surface which is hard and tough and does not abrade when pulled through the string holes of the racquet.

In making the line 11, the core is first formed by assembling in adjacency and twisting synthetic adjacent linear plastic filaments under tension, and is then covered by braiding synthetic plastic filaments around the core, the assembly then being treated with synthetic plastic solution while under tension, the plastic of the solution hardening to lock the parts into an integral line and to form a smooth surface coating. Although it is preferred to use a plastic solution for the integrating step, it may be desirable for some constructions to use a plastic solvent for softening the core and the cover sufficiently to become integrated when drawn under tension.

A line made as described has high tensile strength, very high resiliency when strung, and great resistance to fatigue and distortion, whereby the racquet strings hold their shape, give long wear, are water and oil proof, and do not elongate or stretch with continued use.

Although I have described a specific line construction designed for stringing racquets, it is obvious that the line may be used for other purposes, such as for example for fish-hook leaders, fishing lines, and strings for musical instruments, and that changes in the size and shape of the parts and in the material used, may be made without departing from the spirit and the scope of the invention as defined in the appended claims.

I claim:

1. The method for manufacturing lines made wholly of plastic, comprising the steps of twisting plastic filaments under tension to provide a center core, braiding a cover of plastic filaments around the core, tensioning the cover and the core and treating the cover and core with plastic solution while under tension to integrate the cover and core together and to form a smooth outer surface.

2. The method for manufacturing lines made wholly of nylon, comprising the steps of twisting nylon filaments under tension to provide a center core, braiding a cover of nylon filaments around the core, tensioning the cover and the core and treating the cover and core with nylon solution while under tension to integrate the cover and core together and to form a smooth outer surface.

3. A line having a twisted core of plastic material, a braided sheath of plastic material around the core, and a coating of plastic material penetrating through the sheath to integrally lock the sheath to the core and forming an integral, smooth outer surface.

4. A line having a twisted core of nylon material, a braided sheath of nylon material around the core, and a coating of nylon material penetrating through the sheath to integrally lock the sheath to the core and forming an integral, smooth outer surface.

5. The method of manufacturing lines made wholly of plastic, comprising the steps of assembling linear plastic filaments in adjacency to provide a core, placing the core under tension, braiding a cover of plastic filaments around the core, tensioning the cover and core and treating the cover and core with plastic solution while under tension to integrate the cover and core together and to form a smooth outer surface.

6. The method of manufacturing lines made wholly of plastic, comprising the steps of assembling linear nylon filaments in adjacency to provide a core, placing the core under tension, braiding a cover of nylon filaments around the core, tensioning the cover and core and treating the cover and core with nylon solution while under tension to integrate the cover and core together and to form a smooth outer surface.

7. A line having a core of plastic filaments in adjacent linear arrangement, a braided sheath of plastic material around the core, and a coating of plastic material penetrating through the sheath and integrally locking the sheath to the core and forming an integral smooth outer surface.

8. A line having a core of nylon filaments in adjacent linear arrangement, a braided sheath of nylon material around the core, and a coating of nylon material penetrating through the sheath and integrally locking the sheath to the core and forming an integral smooth outer surface.

JULIAN T. CRANDALL.

References Cited in the file of this patent

UNITED STATES PATENTS

| Number | Name | Date |
| --- | --- | --- |
| 2,065,606 | Moore | Dec. 29, 1936 |
| 2,091,999 | Madge et al. | Sept. 7, 1937 |
| 2,257,648 | Pierce | Sept. 30, 1941 |
| 2,284,728 | Dreyfus | June 2, 1942 |
| 2,308,825 | Rawlings | Jan. 19, 1943 |
| 2,313,058 | Francis, Jr. | Mar. 9, 1943 |
| 2,335,644 | Camp | Nov. 30, 1943 |
| 2,401,291 | Smith | May 28, 1946 |
| 2,500,332 | Whitehead | Mar. 14, 1950 |